May 2, 1967 T. E. WALDROP ETAL 3,316,689
APPARATUS FOR SIMULTANEOUS HEAT SEALING AND HEAT
SHRINKING FILM OVERWRAPPED ABOUT AN OBJECT
Filed Sept. 8, 1964 2 Sheets-Sheet 1

United States Patent Office 3,316,689
Patented May 2, 1967

3,316,689
APPARATUS FOR SIMULTANEOUS HEAT SEALING AND HEAT SHRINKING FILM OVERWRAPPED ABOUT AN OBJECT
Thomas E. Waldrop, Greer, John M. Cook, Greenville, and Thomas R. Lazar, Taylors, S.C., assignors to W. R. Grace & Co., Duncan, S.C., a corporation of Connecticut
Filed Sept. 8, 1964, Ser. No. 394,744
19 Claims. (Cl. 53—184)

This invention relates to the heat shrinking of film overwrapped about an object. In one aspect, the invention relates to the heat sealing of overwrapped film about an object. In another aspect, the invention relates to the continuous simultaneous heat sealing and heat shrinking of overwrapped film about an multilateral object.

Various flexible sheet materials, plastic films, coated foils and the like have been used in the packaging of objects including food products. These materials provide an inexpensive substantially air tight package when properly sealed which will maintain perishable items in a state of freshness for a relatively long period of time and, due to their transparency, produce a highly attractive package. For example, with certain food products, such as cheese, it is possible to employ a heat shrinkable transparent film, such as irradiated biaxially oriented polyethylene which, after being overwrapped about the package, can be heat sealed at the overlap and then subjected to elevated temperatures to shrink the film tightly about the package. In the case of food, such as cheese, the application of the proper temperature not only shrinks the film tightly, but also results in "oiling-off." This latter term refers to causing the butter fat to cling to the surface of the film due to melting of the outer surface of the cheese. This not only improves the appearance by providing a smooth surface, but eliminates oxygen which would cause deterioration of the product.

A number of devices have been proposed for accomplishing this objective, but they require first heat sealing the overwrapped film and subsequently heat shrinking the package. In addition, the heretofore proposed devices have lacked the flexibility to adapt to irregular surfaces of multilateral objects having unusual plane surfaces or angles.

It is an object of the invention to provide apparatus for heat sealing film overwrapped about an object.

Still another object of the invention is to provide apparatus for heat shrinking film overwrapped about an object.

Still another object of the invention is to provide for the simultaneous heat sealing and heat shrinking of film overwrapped about a multilateral object.

These and other objects of the invention will be readily apparent to those skilled in the art from the accompanying disclosure, drawings, and appended claims.

It has now been discovered that all surfaces of a multilateral object can be quite simply heat treated so as to provide simultaneous heat shrinking and heat sealing of the overwrapped film. These objects are broadly accomplished by the employment of a series of resilient, heated rollers adapted to contact each surface of the multilateral object except for the anterior and posterior surfaces. The object is fed through the series of rollers successively discharging into contact with a shrinking or restraining member at a distance from the terminal rollers substantially that of the length of the object so that the ends of the object will contact both the restraining member and a terminal roller simultaneously. The terminal roller is preferably an upright or vertical roller so that the anterior or leading surface will strike the pivotable, heated restraining member thus causing the posterior surface to be rotated about the point of contact while in contact with the upright roller so as to simultaneously shrink both the anterior and posterior surfaces.

Figure 1:
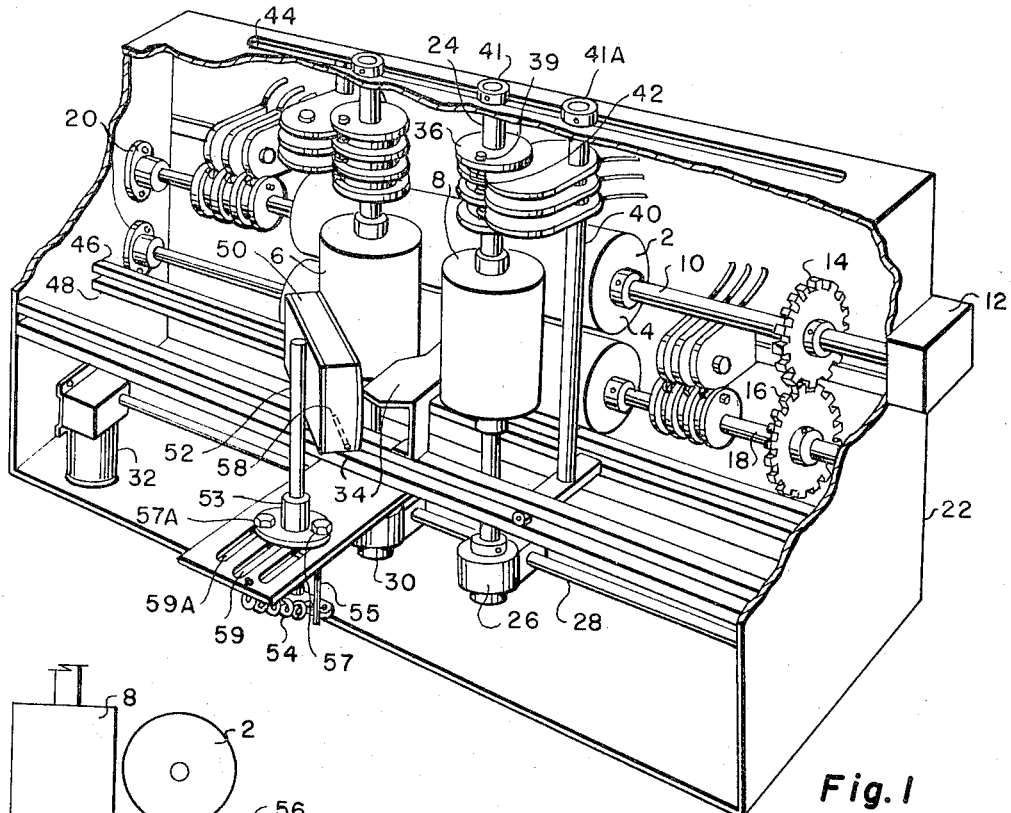
FIGURE 1 is a perspective view of the one suitable embodiment of the apparatus showing horizontal rollers, vertical rollers and a flat member for sealing one end.
Figure 5:
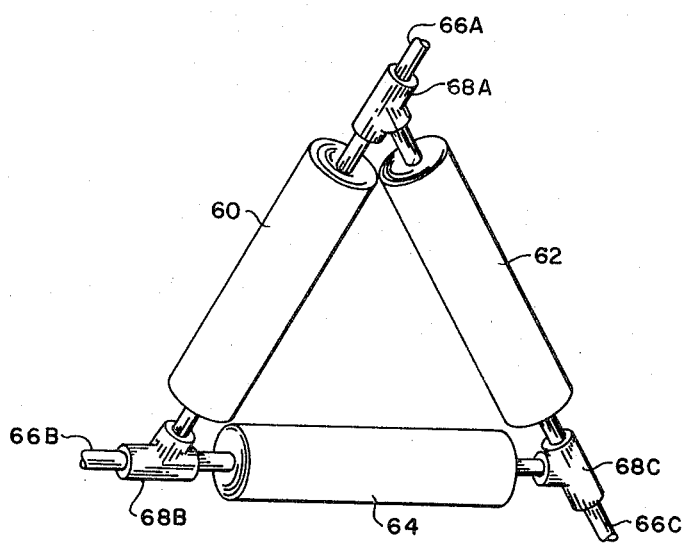
FIGURE 5 is a perspective view of one suitable embodiment of the apparatus showing three rollers in a single plane for triangular objects.

The invention is best described with reference to the drawings which represent the preferred embodiment of the invention. For simplicity, the invention is described with reference to the packaging of a wedge-shaped block of cheese packaged in a film of polyethylene overlap wrapped about said package with the overlap on the under side. The object to be wrapped, for example cheese, may be wrapped by any suitable means either manually, semi-automatically or automatically and fed, preferably narrow end forward, between rollers 2 and 4. For simplicity, the rollers described are cylindrical, resilient pressure rollers. The surfaces of these rollers are heated by any suitable means. Since the plane sides of the wedge-shaped block of cheese are substantially vertical and the top and bottom are substantially perpendicular to the sides, rollers 2 and 4 are preferably horizontally disposed. The wedge-shaped block of cheese passes narrow end forward between horizontal rollers 2 and 4 and then between upright rollers 6 and 8. Horizontal roller 2 is driven by motor 12 connected to shaft 10. Horizontal roller 4 may be driven by any suitable means, for example, motor 12 is connected through shaft 10, sprockets 14 and 16 and shaft 18 to roller 4. Shafts 10 and 18 are supported in journal boxes 20, suitably anchored to frame 22 for convenience. The apparatus described herein is shown as contained in a box-like structure 22 although any suitable framing may be employed. Upright roller 8 is shown in a vertical position substantially 90° from a plane passing between the horizontal rollers. It will be obvious to one skilled in the art that both the upright and the horizontal rollers may be positioned at any suitable angle corresponding to the angles on the sides, top and bottom of the object to be treated. For example, if a rectangular elongated object is to be treated, four rollers could be employed in the same plane so as to form a rectangular area through which the rectangular object will pass in intimate contact at one time with all four rollers. A set of three rollers in a vertical plane and enclosing a triangular area as shown in FIGURE 5 could be employed for the treatment with an elongated triangular object. The rollers 60, 62, 64 may be interconnected and driven in any suitable manner. For example, the shafts 66A, 66B, 66C are interconnected through gear boxes 68A, 68B, 68C as shown in FIGURE 5 and the individual shafts connected to a motor (not shown) in the same manner as illustrated in FIGURE 1. The exact number and location of the rollers will depend on the number of sides of the object as well as the angles formed by said sides.

Roller 8 is connected through shaft 24 to an offset drive 26 which in turn is connected through a shaft 28 and offset drive 30 to a motor 32. Roller 6 is similarly connected (not shown) so that rollers 6 and 8 counterrotate at identical speeds, as do horizontal rollers 2 and 4, so that the object to be treated passes first between the horizontal rollers and subsequently between vertical rollers 6 and 8. Platform 34, suitably mounted, provides support for the object passing through rollers 6 and 8. These rollers, 2, 4, 6 and 8 may be heated by any suitable means. A suitable means is the surface heating of the rollers electrically with electrically resistant wires embedded in the rollers. Electricity is supplied to these heating wires in the surface of the rotating driven rollers by any suitable means, such as through a slip ring or commutating mechanism. For example, mounted on shaft 24 is a series of slip rings 36 connected to brushes (not shown) mounted on a shaft 39 separated by insulators 42. These brushes are connected to a suitable power source (not shown) through suitable wiring connections. Similar devices are also employed for rollers 2, 4 and 6.

Any suitable means may be provided for adjustment of distance between either the horizontal or vertical pairs of rollers, for example, offset drives 26 and 30 may be suitably mounted on shaft 28 with the upper end of the shaft 24 extending through an elongated slot 44. Lock collars 41 and 41A can be provided to position the shafts 24 and 40 respectively. Similarly, shaft 40 is slidably mounted between pairs of bars 46 and 48 suitably mounted on frame 22. Similar devices can be employed for the mounting of shafts 2, 4, and 6. Another suitable device for adjusting the distance between the rollers is to provide constant tension negator springs with appropriate changes in the drive mechanism.

Figure 2:
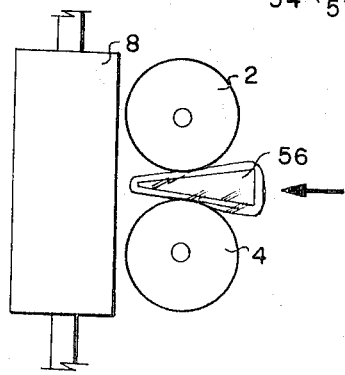
FIGURE 2 is an elevational view of two horizontal rollers and a vertical roller showing passage of a wedge-shaped object between the horizontal rollers.
Figure 3:
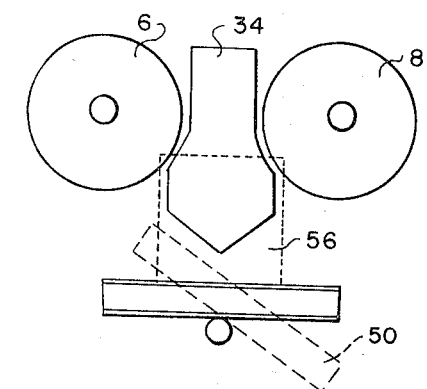
FIGURE 3 is a plan view of the two vertical rollers showing passage of the object therebetween and striking the forward end sealing member.
Figure 4:
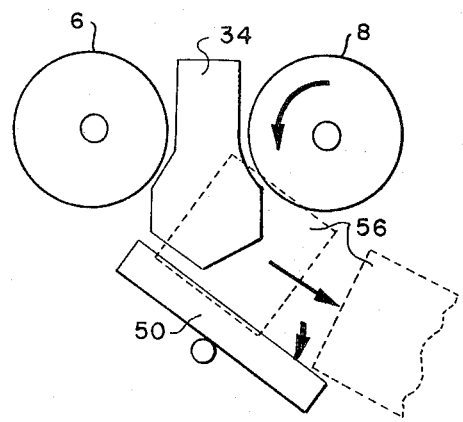
FIGURE 4 is a plan view similar to FIGURE 3 showing the sealing of the posterior surface by rotation against the vertical roller.

As shown in FIGURE 2, the wedge-shaped block of cheese with the overlap under side is passed between rollers 2 and 4, narrow edge forward. The object then passes between rollers 6 and 8 in intimate contact with the heated surfaces of rollers 6 and 8. As shown in FIGURE 3, the forward end of the block then contacts pivotably mounted restraining member 50 which is suitably mounted so that the pivot point or shaft 52 is in the center of the flow path of the object. The shaft 52 is spring loaded by urging means 54 suitably mounted so that arm 55 on shaft 52 is stopped by bolt 57. Member 50 is forced to rotate slightly counter-clockwise by the driving force of rollers 6 and 8. The contacting surface of member 50 is slidably positioned at a distance from the vertical roller 8 substantially that the length of the object 56. Member 50 may be mounted to provide for adjustment of this distance, such as by shaft 52 having collar 53 attached through bolts 57 and 57A slidably located in slots 59 and 59A. Member 50 may be heated substantially as described for rollers 2, 4, 6 and 8 or by any other suitable means. A thermocouple 58 may be used to provide a means for measuring the temperature of the contacting surface of member 50. As shown in FIGURE 3, as the forward edge of the object driven by rollers 6 and 8 passes over support 34 and contacts member 50 as shown by the dotted lines, member 50 rotates counter clockwise to the position shown in solid lines. As shown in FIGURE 4, the posterior surface of object 56 is then engaged by roller 8 causing rotation of the posterior surface clockwise thus resulting in member 50 returning to its original position. After passage of the posterior surface by the roller 8, object 56 is discharged onto any suitable conveying means. Thus, by this device, the sides are heated by rollers 6, 8, the top and bottom by rollers 2 and 5, the anterior surface by member 50 and the posterior surface by roller 8.

The temperature of these individual rollers and member 50 may be controlled by any suitable means so long as the surface temperatures are sufficient to provide heat shrinkage of the film when in contact therewith. In addition, at least the surface of the roller which is in contact with the overlapped portion of the film, for example roller 4 when the overlap is on the bottom, is elevated in temperature sufficient to result not only in heat shrinkage but also to heat seal the overlapped film. The particular temperatures employed depends not only on the type film employed but also on film thickness and temperature of the object. Since objects such as refrigerated are frequently employed, it is sometimes desirable to employ suitable means for providing an adequate heat reservoir in the roller. For vinylidene chloride copolymer film, the preferred surface temperature of the sealing roller is from 300 to 325° F. and the surface temperature of the heat shrinking rollers and member 50 is preferably within the range of 250 to 300° F. Of course, the heat sealing roller also causes the film thereon to shrink.

A suitable heat sealing and heat shrinking roller means (FIGURE 6) comprises a shaft 71 surrounded by foam type material 74, such as silicone rubber solidified to form a resilient base. This base not only provides resilience for the surface of the roller, but also provides insulation from the heated sleeve 73 so as to protect any bearings connected to the shaft. The foam base may then be covered with a resilient sleeve 73 such as silicone rubber, which has embedded therein electrically resistant wires 70 which may be spirally wound about the sleeve and connected to any power source (not shown). Since the electrical power source may be readily controlled, the temperature of the surface of roller 2, etc. is readily adjustable. It has been found that when the object to be treated is at a very cold temperature and the number of objects processed per minute is high, there are advantages to including some type of heat reservoir or heat sink 72 between the sleeve and the foam base. One suitable means for providing this heat sink is to include aluminum sheet or metal powder. The temperature of the sleeve can be determined by a temperature sensing means, such as thermostat connected to a temperature indicator.

The type or shape of package employable in the device of this invention is virtually unlimited since any number or combination of rollers may be employed, for example the rollers may be in series or in pairs or all the rollers may be in a plane. Rollers may be mounted at any angle corresponding to the angles of the sides of the object. Preferably the object is a multilateral plane surfaced object having four to six sides. The distance between rollers 6 and 8 in FIGURE 1 is sufficient to permit passage of not only the forward surface but also the trailing surface with intimate contact between the surface of the object and the roller surface. The pressure applied by the rollers depends upon the width of the package, the type of film and the resilience of the roller.

Figures 6, 7:
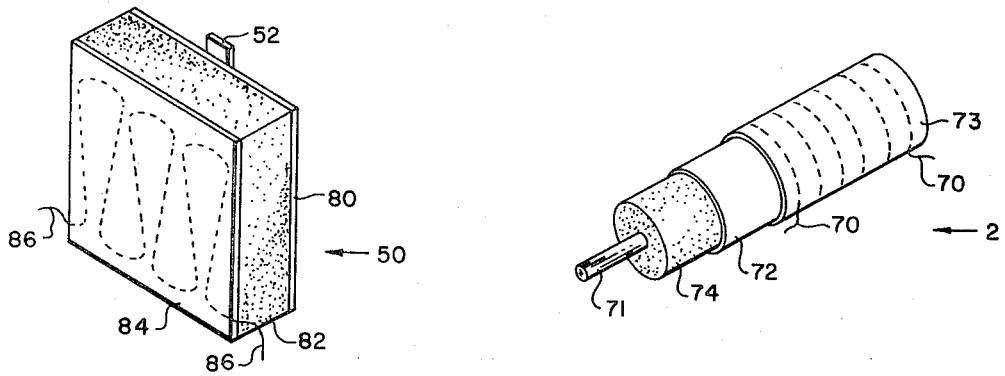
FIGURE 6 is a perspective view of a roller with a heat sink with portions of each layer forming the roller being stripped away.
FIGURE 7 is a perspective view of the restraining member for heating the film on the ends of the object.

The restraining member 50 shown as in FIGURE 7 is a flat surfaced member with an electrically heated surface having a sponge rubber core 82, similar to the rollers, and a metal support plate 80. Any suitable heating means may be employed such as electrical resistance wires 86 embedded in the rubber sheet 84. In addition, the surface may be convex, e.g. a roller mounted, such as on a shaft 52, so as to provide for both clockwise and counter-clockwise rotation. Any suitable means may be provided for returning the pivoted member to its original position. The device as shown rotates counterclockwise and then clockwise thus causing the posterior surface to be treated by roller 8 and then ejected; however, by mounting member 50 at the opposite angle roller 6 could be employed with ejection from the opposite side.

The invention is particularly suitable for the simultaneous heat sealing and heat shrinking of thermoplastic film overlap wrapped about a multilateral object such as the polyolefines, including but not limited to, polyethylene, polypropylene, polybutene-1, the polyvinyls, the vinylidene chloride polymers, such as Saran, polyamides such as nylon and the like. The particular temperatures employed will vary therewith. The term "polymer" as employed herein includes homopolymers, copolymers, terpolymers, block copolymers, random copolymers and the like. The films may also be laminates of different films. The films must be heat shrinkable and are thus molecularly oriented, preferably biaxially oriented. The films, e.g. polyethylene, may be irradiated such as described in patents to Baird, U.S. 3,022,543 and Rainer et al., U.S. 2,877,500, incorporated herein by reference. Preferably the film is 0.1 to 20 mils thick.

Any suitable means may be employed for rotating the individual rollers. Although specific means have been shown for illustrative purposes to drive the various mechanisms employed, many driving means will be readily apparent to those skilled in the art within the scope of the invention.

Among the suitable shaped objects particularly employable with the device of this invention are wedge-shaped hexahedrons, halfmoon shaped quadrilaterals, rectangular or square elongated blocks and the like. For triangular shaped elongated blocks, the upright rollers may be placed at an angle corresponding to the angle formed by the sides or three rollers in a single vertical plane forming a triangular area as shown in FIGURE 5. The member 50 is then preferably tilted at an angle from the vertical corresponding to one of the upright rollers.

While certain examples, compositions and process steps have been described for purposes of illustration, the invention is not limited to these. Variation and modification within the scope of the disclosure and the claims can readily be effected by those skilled in the art.

We claim:

1. A device for heat sealing and shrinking a film overlapped about a multilateral object comprising, in combination, a series of rollers, the surface of at least one roller adapted to contact the top, bottom and side plane surfaces of said object, respectively, said series terminating in at least one upright roller, means for feeding said object through said series of rollers successively, a restraining member positioned on the discharge side of said upright roller at a distance substantially that of the length of said object, so that said object will contact both said member and said upright roller simultaneously, means for heating the surface of said rollers and said member, said member cooperating with said upright roller to heat shrink the film on both the anterior and posterior surfaces of said object.

2. A device for heat sealing and shrinking a film overlapped about a multilateral object having at least four plane surfaces comprising, in combination, a series of pairs of closely spaced rollers, a pair of rollers for at least each set of diametrically opposed plane surfaces except for the anterior and posterior surfaces, said series terminating in a pair of upright, closely spaced rollers, means for counterrotating each pair of rollers so as to feed said object between each pair of rollers successively and discharge said object from said upright rollers, a restraining member positioned in the discharge path of said object at a distance from said upright rollers slightly less than the length of said object so that the anterior and posterior surfaces of said object simultaneously contact said member and one of said upright rollers respectively, means for heating the surfaces of said rollers and said member to the heat shrinking temperature of said film, means for heating the surface of the roller contacting the overlap portion of said film to the heat sealing temperature of said film, said member cooperating with said upright roller to heat shrink the film on both the anterior and posterior surfaces of said object.

3. A device for heat sealing and shrinking a film overlapped about a polyhedral object having plane surfaces comprising, in combination, a first pair of closely spaced resilient, vertically disposed rollers positioned side by side on the discharge side of said horizontal rollers, means for counterrotating said first and second pairs of rollers so as to pass said object between said counterrotating horizontal rollers and then between said counterrotating vertical rollers, a resilient, restraining member positioned in the discharge path of said vertical rollers at a distance slightly less than the length of said object, said member cooperating with at least one of said vertical rollers to heat shrink the film on the anterior and posterior surfaces of said object by simultaneous contact of the anterior and posterior surfaces of said object with said member and one of said vertical rollers respectively, means for heating at least the surface of each of said rollers and said member to above the heat shrinking temperature of said film and means for heating at least the surface of the roller in contact with said overlap to above the heat sealing temperature of said film.

4. The device of claim 3 wherein said member is pivotally mounted about a vertical axis so as to restrain the anterior surface against said member while rotating the posterior surface against the vertical roller.

5. The device of claim 3 wherein said member provides a flat surface for contact with said anterior surface.

6. The device of claim 3 wherein said member provides a convex surface for contact with said anterior surface.

7. The device of claim 3 wherein said object comprises a wedge-shaped hexahedron.

8. The device of claim 3 wherein said object comprises a halfmoon shaped quadrilateral.

9. A device for heat sealing and shrinking a film overlap wrapped about a wedge-shaped polyhedral object having plane surfaces comprising, in combination, a pair of closely spaced, resilient, cylindrical, pressure rollers horizontally disposed one above the other spaced apart at a distance permitting passage of said object therebetween while intimately contacting each roller, means for feeding said wrapped object, overlap down, between said horizontal rollers narrow edge forward, means for heating the lower of the horizontal rollers to above the sealing and shrinking temperature of the film, means for counterrotating said horizontal rollers, a second pair of closely spaced, resilient, cylindrical, pressure rollers vertically disposed one beside the other spaced apart at a distance permitting passage of said object therebetween while in intimate contact with each roller, said vertical rollers positioned immediately adjacent the discharge side of said horizontal rollers, said horizontal and vertical rollers having sufficient surface area to contact substantially all the plane surface, means for counterrotating said vertical rollers, means for heating each of said vertical rollers above the shrinking temperature of the film, a flat pivotally mounted, resilient restraining member positioned slightly less than the length of said object from the discharge side of the said vertical rollers, means for heating said member above the shrinking temperature of said film so that the anterior surface of said object is temporarily restrained by said member and the posterior surface of the object is rotated against one of the vertical rollers thus heat shrinking the film on both surfaces, and means for urging said member to return to its original position after permitting discharge of said object.

10. The device of claim 9 wherein said means for heating said rollers comprises heat conducting means embedded in the surface of said rollers.

11. The device of claim 9 wherein said rollers each comprise an axially positioned, driven shaft, a resilient foamed material surrounding said shaft forming a cylinder, a resilient heat conducting cylindrical sleeve forming the surface of the roller, said sleeve impregnated with electrically resistant heating wires and means for passing an electrical current through said wires.

12. The device of claim 9 wherein the surface temperature of each of said rollers is individually controlled.

13. The device of claim 9 wherein a metal member acting as a heat sink is positioned between said sleeve and said resilient foamed material.

14. The device of claim 13 wherein said metal is powdered.

15. The device of claim 9 wherein said restraining member comprises a flat, resilient, vertically disposed member positioned at an angle from a plane passing between said vertical rollers, said member being pivoted about a vertical axis passing through said member intermediate its ends and through said plane.

16. The device of claim 11 wherein said member comprises a resilient, foamed material surfaced on the object-contacting side with resilient material impregnated with electrical resistant wires and means for passing a current through said wires.

17. The device of claim 9 wherein the spacing between said rolls is adjustable.

18. A device for heat sealing and shrinking a film overlapped about an elongated rectangular object comprising, in combination, two upright and two horizontally disposed rollers positioned end to end to form a closed rectangular area slightly less in cross section than the end cross section of said object, said rollers being in the same plane, means for counterrotating the opposing rollers, means for feeding said overlapped object between said rollers, a restraining member positioned in the discharge path of said object at a distance from one of said upright rollers slightly less than the length of said object so that the anterior and posterior surfaces of said object simultaneously contact said member and said upright roller respectively, means for heating the surface of the roller contacting the overlap portion of said film to the heat sealing temperature of said film, and means for heating the surfaces of the remainder of said rollers and said member to the heat shrinking temperature, said member cooperating with said upright roller to heat shrink the film of both the anterior and posterior surfaces of said object.

19. A device for heat sealing and shrinking a film overlapped about an elongated triangular object having plane surfaces comprising, in combination, three rollers positioned end to end to form a closed triangular area slightly less in cross section than the triangular cross section of said object, said rollers being in the same plane, two of said rollers being upright and one roller being substantially horizontal, means for rotating said rollers, means for feeding said object between said rollers, a restraining member positioned in the discharge path of said object at a distance from one of said upright rollers slightly less than the length of said object so that the anterior and posterior surfaces of said object simultaneously contact said member and said upright roller respectively, means for heating the surface of the remainder of said rollers and said member to the heat shrinking temperature, said member cooperating with said upright roller to heat shrink the film on both the anterior and posterior surfaces of said object.

No references cited.

GRANVILLE Y. CUSTER, JR., *Primary Examiner.*